US012542222B2

(12) United States Patent
Torii et al.

(10) Patent No.: US 12,542,222 B2
(45) Date of Patent: Feb. 3, 2026

(54) ELECTRICAL CONTACT MATERIAL, AND CONTACT, TERMINAL AND CONNECTOR MADE USING THIS

(71) Applicants: FURUKAWA ELECTRIC CO., LTD., Tokyo (JP); FURUKAWA AUTOMOTIVE SYSTEMS INC., Inukami-gun (JP)

(72) Inventors: Yoshitane Torii, Tokyo (JP); Shuichi Kitagawa, Tokyo (JP); Soki Kuzuhara, Tokyo (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 72 days.

(21) Appl. No.: 18/579,877

(22) PCT Filed: Mar. 10, 2023

(86) PCT No.: PCT/JP2023/009299
§ 371 (c)(1),
(2) Date: Jan. 17, 2024

(87) PCT Pub. No.: WO2023/189418
PCT Pub. Date: Oct. 5, 2023

(65) Prior Publication Data

US 2024/0321474 A1 Sep. 26, 2024

(30) Foreign Application Priority Data

Mar. 30, 2022 (JP) ................................ 2022-055027

(51) Int. Cl.
*H01B 1/02* (2006.01)

(52) U.S. Cl.
CPC ..................................... *H01B 1/02* (2013.01)

(58) Field of Classification Search
CPC ....................................................... H01B 1/02
See application file for complete search history.

(56) References Cited

U.S. PATENT DOCUMENTS 4,971,754 A * 11/1990 Fontet ................ H01H 1/02376
419/21
2015/0079422 A1 3/2015 Sunaga et al.
(Continued)

FOREIGN PATENT DOCUMENTS

JP 2008-169408 A 7/2008
JP 2015-048483 A 3/2015
JP 6611602 B2 11/2019

OTHER PUBLICATIONS

International Search Report & Written Opinion issued May 16, 2023 in PCT/JP2023/009299, filed on Mar. 10, 2023, 12 pages (with English Translation).
(Continued)

*Primary Examiner* — William D Young
(74) *Attorney, Agent, or Firm* — Oblon, McClelland, Maier & Neustadt, L.L.P.

(57) ABSTRACT

An electrical contact material includes an electroconductive substrate, and a silver-containing layer including silver provided to at least part of a surface of the electroconductive substrate. An average GOS value of the silver-containing layer is 1.00° or less and a proportion of KAM value of 1.00° or more in the silver-containing layer is 20% or more in a cross section of the electrical contact material.

20 Claims, 1 Drawing Sheet

(56) References Cited

U.S. PATENT DOCUMENTS

| | | | | |
|---|---|---|---|---|
| 2019/0214758 | A1* | 7/2019 | Kato | H01R 13/11 |
| 2020/0048785 | A1 | 2/2020 | Sadamori et al. | |

OTHER PUBLICATIONS

Extended European Search Report issued Dec. 10, 2025, in the European Patent Application No. 23779442.5, citing documents 1-3, 9 pages

* cited by examiner

ELECTRICAL CONTACT MATERIAL, AND CONTACT, TERMINAL AND CONNECTOR MADE USING THIS

TECHNICAL FIELD

The present disclosure relates to an electrical contact material, and a contact, terminal and connector made using this.

BACKGROUND ART

In the recent years, in order to achieve fuel savings in automobiles, electrification of the vehicle drive systems has progressed. Accompanying the electrification of the vehicle drive systems, the amount of electrical current in wires between the battery, inverter and motor dramatically increases, while the heat generation at contacts and connectors during the flow of current becomes a problem. For this reason, a material made by conducting nickel base plating on the surface of a high conductivity pure copper, dilute copper alloy or corson alloy, and further conducting silver plating or silver alloy plating on the base plating has been used in the contacts and the connectors. However, since silver is a metal species which is prone to adhesive wear, the silver plating tends to be shaved off when sliding. For this reason, there has been a deficiency in that the contact resistance of the silver plating material will rise from wearing of the silver plating.

Addressing such a deficiency, for example, Patent Document 1 discloses a silver-plated terminal for connectors in which the surface of the base material consisting of copper or copper alloy is covered by a silver plating layer, the silver plating layer consists of a first silver plating layer on a lower layer side and a second silver plating layer on the upper layer side of the first silver plating layer, and the crystal grain size of the first silver plating layer is greater than the crystal grain size of the second silver plating layer. To address the problem in the silver plating material of the crystal grain size of the silver plating layer tending to increase by recrystallization, hardness lowering from the increase in this crystal grain size, and the wear resistance declining, Patent Document 1 defines the size of the crystal grain size of the silver plating layer as a material with good wear resistance. However, the size of the crystal grain size depends on the thickness of the plating layer. For this reason, to obtain favorable wear resistance, Patent Document 1 limits the thickness of the silver plating layer.

In addition, Patent Document 2 discloses a production method of a silver plating material which forms a silver plated film with 99.9% by mass or more purity on a substrate as a material, by performing electroplating so that y and x become a predetermined relationship, with y being the product of the concentration of potassium cyanide in the silver plating solution and the current density, and x being the solution temperature, in a silver plating solution containing a predetermined concentration of silver and potassium cyanide. Patent Document 2 exemplifies a production method of a silver plating material made to suppress an increase in contact resistance while maintaining high hardness, by containing elements such as selenium in the silver plating film, and the Vicars hardness of the silver plating material surface is the basis for wear resistance. In this way, Patent Document 2 uses, in the evaluation of wear resistance, the Vicars hardness of the silver plating material which depends on the properties of the substrate. However, originally, it is necessary to evaluate the wear resistance of the plated film itself hardly influenced by the substrate properties.

CITATION LIST

Patent Document

Patent Document 1: Japanese Unexamined Patent Application, Publication No. 2008-169408
Patent Document 2: Japanese Patent No. 6611602

DISCLOSURE OF THE INVENTION

Problems to be Solved by the Invention

The object of the present disclosure is to provide an electrical contact material having superior wear resistance which is hardly influenced by the substrate properties, as well as a contact, terminal and connector made using this.

Means for Solving the Problems

[1] An electrical contact material includes: an electroconductive substrate; and a silver-containing layer including silver provided to at least part of a surface of the electroconductive substrate, in which an average GOS value of the silver-containing layer is 1.00° or less and a proportion of KAM value of 1.00° or more in the silver-containing layer is 20% or more in a cross section of the electrical contact material.

[2] In the electrical contact material according to [1] above, an average crystal grain size in the silver-containing layer is 0.2 μm or more and 2.0 μm or less.

[3] In the electrical contact material according to [1] or [2] above, the silver-containing layer is a pure silver layer.

[4] In the electrical contact material according to any one of [1] to [3] above, an average thickness of the silver-containing layer is 0.5 μm or more and 5.0 μm or less.

[5] In the electrical contact material according to any one of [1] to [4] above, the electrical contact material further includes an intermediate layer consisting of nickel or nickel alloy between the electroconductive substrate and the silver-containing layer.

[6] In the electrical contact material according to [5] above, an average thickness of the intermediate layer is 0.01 μm or more and 3.00 μm or less.

[7] A contact is made using the electrical contact material according to any one of [1] to [6] above.

[8] A terminal is made using the electrical contact material according to any one of [1] to [6] above.

[9] A connector is made using the electrical contact material according to any one of [1] to [6] above.

Effects of the Invention

According to the present disclosure, it is possible to provide an electrical contact material having superior wear resistance which is hardly influenced by the substrate properties, as well as a contact, terminal and connector made using this.

PREFERRED MODE FOR CARRYING OUT THE INVENTION

The details will be explained below based on an embodiment.

The present inventors focused on the strain amount in a silver-containing layer provided to at least part of the surface of an electroconductive substrate, and found, as a result of extensive research, that by controlling the GOS value and the KAM value of the silver-containing layer, the wear resistance of the electrical contact material was superior independently of the properties of the electroconductive substrate, and based on such knowledge, arrived at completing the present disclosure.

The electrical contact material according to the embodiment includes an electroconductive substrate, and a silver-containing layer including silver provided to at least part of a surface of the electroconductive substrate, in which an average GOS value of the silver-containing layer is 1.00° or less and a proportion of KAM value of 1.00° or more in the silver-containing layer is 20% or more in a cross section of the electrical contact material.

Figure 1:
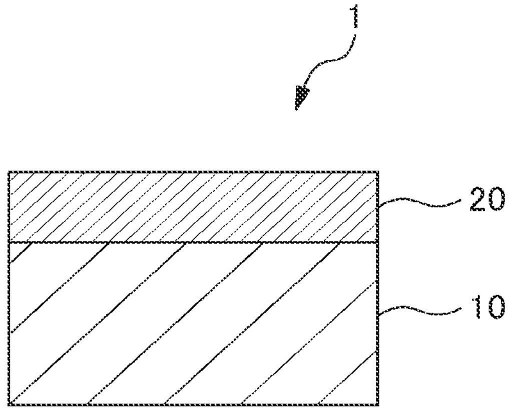
FIG. 1 is a cross-sectional view showing an example of an electrical contact material according to an embodiment.

FIG. 1 is a cross-sectional view showing an example of an electrical contact material according to an embodiment. As shown in FIG. 1, an electrical contact material 1 includes an electroconductive substrate 10 and a silver-containing layer 20.

The electroconductive substrate 10 constituting the electrical contact material 1 is a rolled material having electrical conductivity, and is obtained by a rolling process. From the viewpoint of the rolling processability of the electroconductive substrate 10 and high electroconductivity of the electrical contact material 1, the electroconductive substrate 10 is preferably made from a copper-based material containing pure copper and copper alloy, or an iron-based material containing pure iron and iron alloy. Thereamong, it is preferably a copper alloy based on Cu—Zn, Cu—Ni—Si, Cu—Sn—Ni, Cu—Cr—Mg, or Cu—Ni—Si—Zn—Sn—Mg.

The electrical conductivity of the electroconductive substrate 10 is preferably 60% IACS or more, and more preferably 80% IACS or more. When the electrical conductivity of the conductivity substrate 10 is 60% IACS or more, the electrical contact material 1 has favorable electroconductivity.

The shape of the electroconductive substrate 10 may be appropriately selected according to the application of the electrical contact material 1; however, it is preferably a strip, plate, rod or wire.

The silver-containing layer 20 constituting the electrical contact material 1 is provided to at least part of the surface of the electroconductive substrate 10, and contains silver. The silver-containing layer 20 covering the surface of the electroconductive substrate 10 consists of pure silver or silver alloy, and preferably consists of pure silver, i.e. the silver-containing layer 20 is a pure silver layer. From the viewpoint of the electrical contact material 1 having superior wear resistance, and the wear resistance of the electrical contact material 1 hardly being influenced by the properties of the electroconductive substrate 10, the silver-containing layer 20 is preferably formed by plating, i.e. the silver-containing layer 20 is preferably a plated film.

In the cross section of the electrical contact material 1 shown in FIG. 1, the average GOS value of the silver-containing layer 20 is 1.00° or less, and the proportion of KAM value of 1.00° or more in the silver-containing layer is 20% or more. The cross section of the electrical contact material 1 is a cross section parallel to the rolling direction of the electroconductive substrate 10.

For the silver-containing layer 20 in the cross section of the electrical contact material 1, when the average GOS value is 1.00° or less, the strain amount remaining in the crystal grain in the silver-containing layer 20 is low, and when the proportion of KAM value of 1.00° or more is 20% or more, it is possible to maintain high strain amount remaining in the silver-containing layer 20, and since the hardness becomes high, it is possible to improve wear resistance.

From such a viewpoint, the average GOS value of the silver-containing layer 20 in the cross section of the electrical contact material 1 is 1.00° or less, preferably 0.75° or less, and more preferably 0.50° or less. In addition, in the cross section of the electrical contact material 1, the proportion of KAM value of 1.00° or more of the silver-containing layer 20 is 20% or more, and is more preferably 25% or more.

In addition, for the silver-containing layer 20 in the cross section of the electrical contact material 1, the proportion of KAM value of 1.00° or more is preferably 50% or less. When the proportion of KAM value of 1.00° or more in the silver-containing layer 20 is 50% or less, it is possible to suppress a decline in the bending workability due to the strain amount in the silver-containing layer 20 becoming excessive.

GOS (Grain Orientation Spread) value is the average value of the misorientation between a certain measurement point i and all measurement points (including measurement point i) in the crystal grains, and is a parameter reflecting a change in the overall crystal orientation of the crystal grains, and is a value arrived at by integrating local misorientation. Relative to the KAM value which is a value reflecting the local strain amount in the silver-containing layer 20, the GOS value is a value reflecting the average strain amount in the silver-containing layer 20. The GOS value can be represented by Formula (1) below.

[formula 1]

$$GOS = \frac{\left\{\sum_{i=1}^{n_g}\left(\sum_{j=1}^{n_g}\alpha_{ij}\right)\right\}}{(n_g)^2} \quad (1)$$

$\alpha_{ij}$: crystal misorientation between measurement point i and measurement point j $n_g$: number of measurement points in crystal grains The GOS value serves as a parameter reflecting the change in overall crystal orientation of the crystal grains, and corresponds to a value arrived at by integrating the local misorientation (KAM value). In addition, the GOS value depends on the crystal grain size, and is considered to increase as the crystal grains become larger.

The KAM (Kernel Average Misorientation) value at the measurement point i is the average value for the misorientation between a certain measurement point i and a measurement point j adjacent to the measurement point i, and is a value reflecting the strain amount in the silver-containing layer 20. The KAM value can be represented by the following Formula (2).

[formula 2]

$$KAM = \frac{\sum_{j=1}^{n} \alpha_{ij}}{n} \quad (2)$$

$\alpha_{ij}$: crystal misorientation between measurement point i and measurement point j n: number of measurement points j adjacent to measurement point i The KAM value is calculated for all measurement points within the field of view, the average value thereof is defined as a representative value of this field of view, and the KAM value has a tendency of becoming larger at locations of large strain and near grain boundaries.

The GOS value and the KAM value can be obtained from crystal orientation analysis data calculated using analysis software (OIM Analysis produced by TSL Solutions) from the crystal orientation data measured continuously using EBSD detector (OIM 5.0 HIKARI produced by TSL Solutions) belonging to a high-resolution scanning analytical electron microscope (JSM-7001FA manufactured by JEOL Ltd.). The measurement target is the silver-containing layer 20 surface on a surface which was obtained by mirror finishing the cross section of the electrical contact material 1 parallel to the rolling direction of the electroconductive substrate 10 with the use of cross section polisher (manufactured by JEOL, Ltd.), and the measurement magnification is 30000 times. The measurement by steps of 50 nm or less measurement intervals conducts, the measurement points at which the CI value analyzed by the analysis software is 0.1 or less are eliminated (noise elimination), the boundary at which the misorientation between adjacent pixels is 5.00° or more is regarded as the grain boundary, to obtain the GOS value and the KAM value. This measurement is performed a plurality of times (plurality of different measurement regions on same sample), and the average value thereof was calculated, whereby the average GOS value and the average KAM value can be obtained. In addition, it is possible to obtain the proportion of KAM value of 1.00° or more from the KAM values. In this way, the average GOS value and the average KAM value are respectively the average value of GOS values and the average value of KAM values in the measurement region of the silver-containing layer measured at the magnification of 30000 times, and the proportion of KAM values of 1.00° or more is a proportion of KAM values of 1.00° or more relative to KAM values in the measurement region of the silver-containing layer measured at the magnification of 30000 times.

In addition, the average crystal grain size in the silver-containing layer 20 is preferably 0.2 μm or more, more preferably 0.4 μm or more, and even more preferably 0.6 μm or more. When the average crystal grain size in the silver-containing layer 20 is 0.2 μm or more, it is possible to further improve wear resistance.

In addition, the average crystal grain size in the silver-containing layer 20 is preferably 2.0 μm or less, more preferably 1.5 μm or less, and even more preferably 1.0 μm or less. When the average crystal grain size in the silver-containing layer 20 is 2.0 μm or less, it is possible to stably maintain wear resistance.

In addition, the silver-containing layer 20 may contain at least one element (also referred to as second element hereinafter) selected from the group consisting of Sn, Zn, In, Ni, Cu, Se, Sb and Co. By having the second element coexist in the silver-containing layer 20, it is possible to improve the sliding property. Thereamong, from the viewpoint of improving the electrical connection property of the electrical contact material 1, the silver-containing layer 20 preferably contains less than 15.0 at % in total of the at least one element selected from the group consisting of Sn, Zn, In, Ni, Cu, Se, Sb and Co. In addition, from the viewpoint of an efficient improvement in slidability due to the addition of the second element and a material cost reduction, the silver-containing layer 20 preferably contains 0.1 at % or more in total of the at least one element selected from the group consisting of Sn, Zn, In, Ni, Cu, Se, Sb and Co.

The lower limit value for the average thickness of the silver-containing layer 20 is preferably 0.5 μm or more, more preferably 2.0 μm or more, and even more preferably 3.0 μm or more. The upper limit value for the average thickness of the silver-containing layer 20 is preferably 5.0 μm or less. When the lower limit value for the average thickness of the silver-containing layer 20 is 0.5 μm or more, it is possible to maintain superior wear resistance of the electrical contact material 1 over a long period. When the upper limit value for the average thickness of the silver-containing layer 20 is 5.0 μm or less, it is possible to suppress the material cost.

Figure 2:
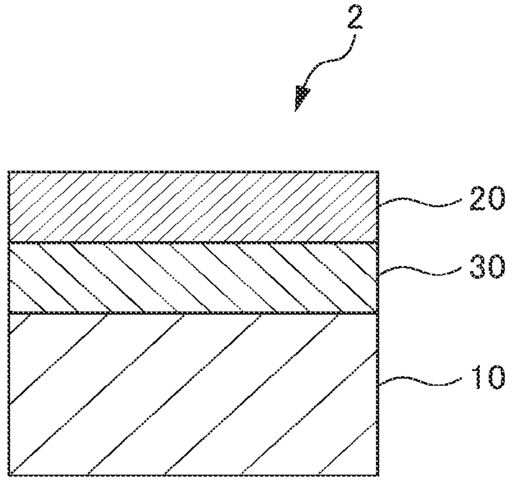
FIG. 2 is a cross-sectional view showing another example of an electrical contact material according to an embodiment.

FIG. 2 is a cross-sectional view showing another example of an electrical contact material according to an embodiment. In the electrical contact material 2 shown in FIG. 2, other than the configuration of an intermediate layer 30 being added, it is basically the same as the configuration of the electrical contact material 1 shown in FIG. 1.

As shown in FIG. 2, the electrical contact material 2 further includes an intermediate layer 30 consisting of nickel or nickel alloy between the electroconductive substrate 10 and silver-containing layer 20. When the intermediate layer 30 is provided between the surface of the electroconductive substrate 10 and the silver-containing layer 20, it is possible to suppress the thermal diffusion of the elements constituting the electroconductive material 10 to the silver-containing layer 20, and to improve the adhesion between the electroconductive substrate 10 and the silver-containing layer 20.

From the viewpoint of further suppressing the above thermal diffusion and improving the above adhesion, the intermediate layer 30 is preferably pure nickel or a Ni—P based nickel alloy.

The lower limit value for the average thickness of the intermediate layer 30 is preferably 0.01 μm or more, more preferably 0.10 μm or more, and even more preferably 0.30 μm or more. The upper limit value for the average thickness of the intermediate layer 30 is preferably 3.00 μm or less, more preferably 2.00 μm or less, and even more preferably 1.00 μm or less. When the lower limit value for the average thickness of the intermediate layer 30 is less than 0.01 μm, it is not possible to achieve the above suppression of thermal diffusion and the above improvement in adhesion. When the upper limit value for the average thickness of the intermediate layer 30 exceeds 3.00 μm, the bending workability deteriorates. In the case of using the electrical contact material in a terminal, bending workability of R/t≥1 is demanded.

In addition, the above electrical contact materials 1, 2 may further include a copper layer (not shown) directly below the silver-containing layer 20, which is the top layer. The copper layer (not shown) is made from pure copper or copper alloy. Compared to the thickness of the electroconductive substrate 10, the thickness of the copper layer (not shown) is much smaller. When the electrical contact material 1, 2 further includes the copper layer (not shown) provided directly under the silver-containing layer 20, it is possible to improve adhesion and bending workability.

In the above way, since the electrical contact material 1, 2 has superior wear resistance which is hardly influenced by the properties of the electroconductive substrate 10, the electrical contact material 1, 2 can be favorably used in a contact, a terminal and a connector. Such a contact is a contact prepared using the electrical contact material 1, 2, such a terminal is a terminal prepared using the electrical contact material 1, 2, and such a connector is a connector prepared using the electrical contact material 1, 2.

Next, a production method of the electrical contact material 1, 2 will be explained.

First, a silver-containing layer is formed on at least part of the surface of a substrate having electroconductivity by a plating method or the like. Next, the substrate provided with the silver-containing layer on the surface is rolled. The electrical contact material 1 can be produced in this way.

In addition, an intermediate layer is formed on at least part of the surface of a substrate having electroconductivity by a plating method or the like. Next, a silver-containing layer is formed on the intermediate layer by a plating method or the like. Next, the substrate provided with the intermediate layer and the silver-containing layer is rolled. The electrical contact material 2 can be produced in this way.

For the plating conditions of the silver-containing layer, it is possible to further raise the internal stress of the silver-containing layer, from many crystal grains with different crystal orientation growing, and the difference in crystal orientation becoming greater, by setting the current density to 5 A/dm$^2$ or more and 10 A/dm$^2$ or less, and setting the bath temperature (solution temperature) to 25° C. or higher to prioritize nucleation. By controlling the current density and the temperature to the above ranges, it is possible to control the proportion of KAM value of 1.00° or more in the silver-containing layer to 20% or more by controlling the KAM value in the silver-containing layer. Even if the temperature is 25° C. or higher, when the current density is less than 5 A/dm$^2$, the crystal grains become coarse, the crystal grains of different crystal orientation become scarce, and the average KAM value in the silver-containing layer becomes small, whereby the proportion of KAM value of 1.00° or more becomes less than 20%. In addition, even if the temperature is 25° C. or higher, when the current density exceeds 10 A/dm$^2$, by the fine crystals becoming excessive, the proportion of KAM value of 1.00° or more becomes less than 20%, and surface hardness is too high, whereby bending workability worsens.

In addition, the processing rate of the rolling is 5% or more and 15% or less. If the processing rate is 5% or more, the amount of strain in the silver-containing layer is increased and the wear resistance can be improved. If the processing rate is 15% or less, it is possible to suppress a decline in bending workability due to the strain amount in the silver-containing layer becoming excessive. The processing rate of the rolling is a percentage dividing the difference between the cross-sectional area of a sample prior to the rolling and the cross-sectional area of the sample after the rolling by the cross-sectional area of the sample prior to the rolling. By controlling the processing rate of the rolling to the above range, it is possible to control the proportion of KAM value of 1.00° or more in the silver-containing layer to 20% or more by controlling the KAM value in the silver-containing layer. When the rolling processing rate is less than 5% or the rolling is not carried out, the strain amount at the grain boundary is small, and the measurement points of KAM value of 1.00° or more become small and the proportion of the KAM value of 1.00° or more in the silver-containing layer becomes small, whereby the proportion of KAM value of 1.00° or more becomes less than 20%.

In addition, thermal treatment at 300° C. to 600° C. for 5 to 60 seconds is conducted, after forming the silver-containing layer and before performing the rolling. By this thermal treatment, it is possible to unify the strain introduced by plating. By performing the thermal treatment in the above-mentioned ranges, it is possible to control the average GOS value of the silver-containing layer to 1.00° or less by releasing the strain in the crystal grains. In addition, by releasing the strain in the crystal grains by the thermal treatment, the strain in the silver-containing layer comes to abundantly exist at the crystal grain boundary, and the measurement points indicating a KAM value of 1.00° or more can concentrate in the vicinity of the grain boundary; therefore, it is possible to control the proportion of KAM value of 1.00° or more to 20% or more. For the thermal treatment, if at least one of the thermal treatment temperature less than 300° C. and the thermal treatment time less than 5 seconds, it is not possible to sufficiently release the strain in the crystal grains, and it is not possible to concentrate the measurement points indicating a KAM value of 1.00° or more to the vicinity of the grain boundary; therefore, it is not possible to achieve the average GOS value of 1.00° or less and the proportion of KAM value of 1.00° or more of 20% or more. For the thermal treatment, even if at least one of the thermal treatment temperature exceeding 600° C. and the thermal treatment time exceeding 60 seconds, it is similarly not possible to achieve the average GOS value of 1.00° or less and the proportion of KAM value of 1.00° or more of 20% or more, and further, the thermal treatment is excessive and the material strength declines, and thus when using in a contact, a terminal or a connector, it is not possible to maintain sufficient strength.

In addition, in the case of producing the electrical contact material 1, 2 provided with the silver-containing layer 20 including the second element, the silver-containing layer including the second element may be formed directly by a plating method or the like using a plating bath containing silver component and second element component in the above way. In addition, as another formation method, the silver-containing layer including the second element may be formed by performing a heat treatment after alternately forming the silver-containing layer and second element layer by a plating method or the like. The processing rate of the rolling in this case is preferably 5% or more and 15% or less from the viewpoint of the same aspects of the above. In addition, such heat treatment in this case may be substituted by the above-mentioned thermal treatment conducted after forming the silver-containing layer and before performing the rolling.

According to the above explained embodiment, by focusing on the strain amount in the silver-containing layer provided on the surface of the electroconductive substrate, and controlling the GOS value and the KAM value of the silver-containing layer, it is possible to obtain the electrical contact material having superior wear resistance which is hardly influenced by the substrate properties.

Although an embodiment has been explained above, the present invention is not to be limited to the above embodiment, and includes all aspects encompassed by the gist of the present disclosure and scope of claims, and various modifications are possible within the scope of the present disclosure.

EXAMPLES

Next, Examples and Comparative Examples will be explained; however, the present invention is not to be limited to these Examples.

Examples 1 to 5

For the substrate (EFTEC-550T, 80% IACS, manufactured by Furukawa Electric), after electrolytic degreasing was performed, acid cleaning was performed. Subsequently, a silver-containing layer was formed on the substrate surface by a plating method (current density: 10 A/dm$^2$) with an alkaline cyanide silver bath at the bath temperature of 25° C. (50 g/L silver cyanide, 100 g/L potassium cyanide), then heat treatment was performed at 300° C. to 600° C. for 5 seconds to 60 seconds. Next, by performing rolling at the processing rate shown in Table 1, the electrical contact material including the silver-containing layer (pure silver layer) shown in Table 1 was produced.

Examples 6 to 14

For the substrate (EFTEC-550T, 80% IACS, manufactured by Furukawa Electric), after electrolytic degreasing was performed, acid cleaning was performed. Subsequently, a silver-containing layer was formed on the substrate surface by a plating method (current density: 10 A/dm$^2$) with an alkaline cyanide silver bath at the bath temperature of 25° C. (50 g/L silver cyanide, 100 g/L potassium cyanide), followed by forming a tin layer by a plating method (current density: 10 A/dm$^2$) with a sulfuric acid bath at the bath temperature of 25° C. (80 g/L tin sulfate, 80 g/L sulfuric acid), then heat treatment was performed at 300° C. to 600° C. for 5 seconds to 60 seconds. Next, by performing rolling at the processing rate shown in Table 1, the electrical contact material including the silver-containing layer (silver alloy layer) shown in Table 1 was produced.

Examples 15 to 19

For the substrate (EFTEC-550T, 80% IACS, manufactured by Furukawa Electric), after electrolytic degreasing was performed, acid cleaning was performed. Subsequently, an intermediate layer was formed on the substrate surface by a plating method (current density: 15 A/dm$^2$) with a nickel plating bath at the bath temperature of 55° C. (500 g/L nickel sulfate hexahydrate, 30 g/L nickel chloride, 30 g/L boric acid), then a silver-containing layer was formed on the intermediate layer surface by a plating method (current density: 10 A/dm$^2$) with an alkaline cyanide silver bath at the bath temperature of 25° C. (50 g/L silver cyanide, 100 g/L potassium cyanide), then heat treatment was performed at 300° C. to 600° C. for 5 seconds to 60 seconds. Next, by performing rolling at the processing rate shown in Table 1, the electrical contact material including the silver-containing layer (pure silver layer) and the intermediate layer (pure nickel layer) shown in Table 1 was produced.

Comparative Examples 1 to 3

For the substrate (EFTEC-550T, 80% IACS, manufactured by Furukawa Electric), after electrolytic degreasing was performed, acid cleaning was performed. Subsequently, an intermediate layer was formed on the substrate surface by a plating method (current density: 15 A/dm$^2$) with a nickel plating bath at the bath temperature of 55° C. (500 g/L nickel sulfate hexahydrate, 30 g/L nickel chloride, 30 g/L boric acid), then a silver-containing layer was formed on the intermediate layer surface by a plating method (current density: 10 A/dm$^2$) with an alkaline cyanide silver bath at the bath temperature of 25° C. (50 g/L silver cyanide, 100 g/L potassium cyanide), then heat treatment was performed at less than 300° C. or higher than 600° C. for less than 5 seconds. Next, by performing rolling at the processing rate shown in Table 1, the electrical contact material including the silver-containing layer (pure silver layer) and the intermediate layer (pure nickel layer) shown in Table 1 was produced. It should be noted that Comparative Example 3 did not perform rolling.

Examples 20 to 34

For the substrate (EFTEC-550T, 80% IACS, manufactured by Furukawa Electric), after electrolytic degreasing was performed, acid cleaning was performed. Subsequently, an intermediate layer was formed on the substrate surface by a plating method (current density: 15 A/dm$^2$) with a nickel plating bath at the bath temperature of 55° C. (500 g/L nickel sulfate hexahydrate, 30 g/L nickel chloride, 30 g/L boric acid), then a silver-containing layer was formed on the intermediate layer surface by a plating method (current density: 5 to 10 A/dm$^2$) with an alkaline cyanide silver bath at the bath temperature of 25° C. (50 to 100 g/L silver cyanide, 100 to 200 g/L potassium cyanide), followed by forming a tin layer by a plating method (current density: 10 to 20 A/dm$^2$) with a sulfuric acid bath at the bath temperature of 25° C. (80 g/L tin sulfate, 80 g/L sulfuric acid), then heat treatment was performed at 300° C. to 600° C. for 5 seconds to 60 seconds. Next, by performing rolling at the processing rate shown in Table 1, the electrical contact material including the silver-containing layer (silver alloy layer) and the intermediate layer (pure nickel layer) shown in Table 1 was produced.

Comparative Examples 4 to 9

For the substrate (EFTEC-550T, 80% IACS, manufactured by Furukawa Electric), after electrolytic degreasing was performed, acid cleaning was performed. Subsequently, an intermediate layer was formed on the substrate surface by a plating method (current density: 15 A/dm$^2$) with a nickel plating bath at the bath temperature of 55° C. (500 g/L nickel sulfate hexahydrate, 30 g/L nickel chloride, 30 g/L boric acid), then a silver-containing layer was formed on the intermediate layer surface by a plating method (current density: 5 to 10 A/dm$^2$) with an alkaline cyanide silver bath at the bath temperature of 25° C. (50 to 100 g/L silver cyanide, 100 to 200 g/L potassium cyanide), followed by forming a tin layer by a plating method (current density: 10 to 20 A/dm$^2$) with a sulfuric acid bath at the bath temperature of 25° C. (80 g/L tin sulfate, 80 g/L sulfuric acid), then heat treatment was performed at less than 300° C. or higher than 600° C. for less than 5 seconds. Next, by performing rolling at the processing rate shown in Table 1, the electrical contact material including the silver-containing layer (silver alloy layer) and the intermediate layer (pure nickel layer) shown in Table 1 was produced. It should be noted that Comparative Example 8 did not form an intermediate layer.

Examples 35 to 37

For the substrate (EFTEC-550T, 80% IACS, manufactured by Furukawa Electric), after electrolytic degreasing was performed, acid cleaning was performed. Subsequently, an intermediate layer was formed on the substrate surface by a plating method (current density: 10 A/dm$^2$) with a nickel-phosphorus electrolytic bath at the bath temperature of 55° C. (500 g/L nickel sulfate hexahydrate, 30 g/L nickel chloride hexahydrate, 30 g/L boric acid, 16 g/L phosphonic acid), then a silver-containing layer including the second element was formed on the intermediate layer surface by a plating method (current density: 5-10 A/dm$^2$) with an alkaline cyanide silver bath at the bath temperature of 25° C. (50 to 100 g/L silver cyanide, 100 to 200 g/L potassium cyanide, 15 g/L indium trichloride), then heat treatment was performed at 300° C. to 600° C. for 5 seconds to 60 seconds. Next, by performing rolling at the processing rate shown in Table 1, the electrical contact material including the silver-containing layer (silver alloy layer) and the intermediate layer (nickel alloy layer) shown in Table 1 was produced.

Examples 38 to 55

For the substrate (EFTEC-550T, 80% IACS, manufactured by Furukawa Electric), after electrolytic degreasing was performed, acid cleaning was performed. Subsequently, an intermediate layer was formed on the substrate surface by a plating method (current density: 15 A/dm$^2$) with a nickel plating bath at the bath temperature of 55° C. (500 g/L nickel sulfate hexahydrate, 30 g/L nickel chloride, 30 g/L boric acid), then a silver-containing layer including the second element was formed on the intermediate layer surface by a plating method (current density: 5-10 A/dm$^2$) with an alkaline cyanide silver bath at the bath temperature of 25° C. (50 to 100 g/L silver cyanide, 100 to 200 g/L potassium cyanide, 10 g/L zinc chloride (Examples 38 to 40), 10 g/L nickel chloride (Examples 41 to 46), 12 g/L copper chloride dihydride (Examples 44 to 46), 2.2 mg/L potassium selenocyanate (Examples 47 to 49), 12 g/L antimony trichloride (Examples 50 to 52), 10 g/L cobalt chloride (Examples 53 to 55), then heat treatment was performed at 300° C. to 600° C. for 5 seconds to 60 seconds. Next, by performing rolling at the processing rate shown in Table 1, the electrical contact material including the silver-containing layer (silver alloy layer) and the intermediate layer (pure nickel layer) shown in Table 1 was produced.

(Measurement and Evaluation)

For the electrical contact material obtained in the above Examples and Comparative Examples, the following measurements and evaluation were performed. The results are shown in Table 2.

[1] Average GOS Value and Proportion of KAM Value of 1.00° or More

The GOS value and the KAM value was obtained from crystal orientation analysis data calculated using analysis software (OIM Analysis produced by TSL Solutions) from the crystal orientation data measured continuously using EBSD detector (OIM 5.0 HIKARI produced by TSL Solutions) belonging to a high-resolution scanning analytical electron microscope (JSM-7001FA manufactured by JEOL Ltd.).

Using a cross section polisher (manufactured by JEOL Ltd.), a silver-containing layer surface as a measurement target on a surface was obtained by mirror polishing the cross section of the electrical contact material parallel to the rolling direction of the electroconductive substrate. The measurement magnification was set to 30000 times. The measurement by steps of 50 nm or less measurement intervals was conducted, the measurement points at which the CI value analyzed by the analysis software was 0.1 or less are eliminated, the boundary at which the misorientation between adjacent pixels is 5.00° or more was regarded as the grain boundary, to obtain the GOS value and the KAM value. This measurement was performed five times (measurement region of 5 different locations in same sample), and the average value thereof was calculated to obtain the average GOS value and the average KAM value of the silver-containing layer. In addition, the proportion of KAM value of 1.00° or more in the silver-containing layer was calculated from the KAM value.

[2] Average Crystal Grain Size

For the silver-containing layer surface on the surface obtained by mirror polishing the cross section of the electrical contact material parallel to the rolling direction of the electroconductive substrate using the cross section polisher (manufactured by JEOL Ltd.), the average crystal grain size of the silver-containing layer was obtained by a sectioning method using a line segment perpendicular to the plating thickness direction, in an SEM image obtained with the measurement magnification of 30000 times.

[3] Coefficient of Dynamic Friction

Bulging was performed on the electrical contact material, and a bulged material having a radius of curvature of 5 mm at the bulged part was obtained. On the surface on the silver-containing layer side of the bulged material, reciprocating sliding was performed 15 times with 5N contact load, 5 mm sliding distance and 100 mm/min sliding speed, using a friction wear tester Tribogear (Surface Property Tester Type: 14FW, manufactured by Shinto Scientific Co., Ltd.). The numerical value at the 15$^{th}$ time sliding was defined as the coefficient of dynamic friction. The coefficient of dynamic friction was assigned the following ranking.

◎: coefficient of dynamic friction was less than 0.4

○: coefficient of dynamic friction was 0.4 or more and less than 0.6 x: coefficient of dynamic friction was 0.6 or more

[4] Wear Resistance

On the surface on the silver-containing layer side of the electrical contact material, reciprocating sliding was performed 50 times with 4N contact load, 50 mm sliding distance and 100 mm/min sliding speed, using a friction wear tester Tribogear (Surface Property Tester Type: 14FW, manufactured by Shinto Scientific Co., Ltd.). The ratio of the depth from the reference plane (plane not reciprocally sliding) relative to the thickness of the silver-containing layer was measured with a laser roughness meter. The wear resistance was assigned the following ranking.

◎: ratio of depth from reference plane relative to thickness of silver-containing layer was less than 1/10

○: ratio of depth from reference plane relative to thickness of silver-containing layer was 1/10 or more and less than 1/5 x: ratio of depth from reference plane relative to thickness of silver-containing layer was 1/5 or more

[5] Contact Resistance Value

The contact resistance value was measured 10 times with 20 mA energizing current and 1N load using an electrical contact simulator (manufactured by Yamasaki Seiki) on the surface on the silver-containing layer side of the electrical contact material, and a value averaging the obtained measurement values was defined as the contact resistance value of the electrical contact material. The contact resistance value was assigned the following ranking.

◎: contact resistance value was less than 0.3 mΩ

○: contact resistance value was 0.3 mΩ or more and less than 0.8 mΩ x: contact resistance value was 0.8 mΩ or more

[6] Heat Resistance

Under an air atmosphere, the electrical contact material was heated for 1000 hours at 150° C. After heating, the contact resistance value was measured 10 times with 20 mA energizing current and 1N load using an electrical contact simulator (manufactured by Yamasaki Seiki) on the surface on the silver-containing layer side of the electrical contact material, and a value averaging the obtained measurement values was defined as the contact resistance value of the electrical contact material. The heat resistance value was assigned the following ranking.

◎: contact resistance value after heating was less than 1.0 mΩ

○: contact resistance value after heating was 1.0 mΩ or more and less than 5.0 mΩ x: contact resistance value after heating was 5.0 mΩ or more

[7] Bending Workability

Based on the test method of JCBA-T307:2007 Japan Copper and Brass Association technical standards, five (n=5) test pieces of 10 mm width×30 mm length were collected from the electrical contact material so that the length direction of the test pieces were parallel to the rolling direction, the bending test was performed on each test piece with a bending angle of 90 degrees and R/t=1, and the presence of cracks was determined.

○: 5 test pieces had free of cracks

X: 1 or more test pieces had cracks

TABLE 1

| | Average GOS value (°) | Proportion of KAM value (%) | Average crystal grain size (μm) | Second element | Total concentration of second element (at %) | Average thickness of silver-containing layer (μm) | Intermediate layer | Average thickness of intermediate layer (μm) | Processing rate of rolling (%) | Thermal treatment temperature (° C.) | Thermal treatment time (s) |
|---|---|---|---|---|---|---|---|---|---|---|---|
| Example 1 | 0.50 | 20 | 0.1 | — | — | 10.0 | — | — | 5 | 600 | 5 |
| Example 2 | 1.00 | 20 | 0.1 | | | 0.5 | | | 5 | 300 | 60 |
| Example 3 | 0.50 | 20 | 2.0 | — | — | 10.0 | — | — | 10 | 500 | 5 |
| Example 4 | 1.00 | 20 | 2.0 | — | — | 0.5 | — | — | 10 | 300 | 60 |
| Example 5 | 1.00 | 50 | 2.0 | | | 10.0 | | | 15 | 600 | 5 |
| Example 6 | 0.50 | 20 | 0.1 | Sn | 15.0 | 5.0 | — | — | 5 | 500 | 5 |
| Example 7 | 1.00 | 20 | 0.1 | Sn | 15.0 | 0.5 | — | — | 5 | 400 | 5 |
| Example 8 | 0.50 | 20 | 2.0 | Sn | 15.0 | 5.0 | — | — | 10 | 500 | 10 |
| Example 9 | 1.00 | 20 | 2.0 | Sn | 15.0 | 0.5 | — | — | 10 | 300 | 60 |
| Example 10 | 0.50 | 20 | 0.1 | Sn | 12.0 | 5.0 | — | — | 5 | 400 | 5 |
| Example 11 | 1.00 | 20 | 0.1 | Sn | 12.0 | 0.5 | — | — | 5 | 300 | 5 |
| Example 12 | 0.50 | 20 | 2.0 | Sn | 12.0 | 5.0 | — | — | 10 | 500 | 10 |
| Example 13 | 1.00 | 20 | 2.0 | Sn | 12.0 | 0.5 | — | — | 10 | 300 | 60 |
| Example 14 | 1.00 | 50 | 2.0 | Sn | 12.0 | 10.0 | — | — | 15 | 600 | 10 |
| Example 15 | 0.50 | 20 | 0.1 | — | — | 5.0 | Ni | 0.50 | 5 | 500 | 5 |
| Example 16 | 1.00 | 20 | 0.1 | — | — | 0.5 | Ni | 0.05 | 5 | 300 | 60 |
| Example 17 | 0.50 | 20 | 2.0 | — | — | 5.0 | Ni | 0.50 | 10 | 500 | 5 |
| Example 18 | 1.00 | 20 | 2.0 | — | — | 0.5 | Ni | 0.05 | 10 | 300 | 60 |
| Example 19 | 1.00 | 50 | 2.0 | — | — | 10.0 | Ni | 0.05 | 15 | 600 | 5 |
| Example 20 | 0.50 | 20 | 0.1 | Sn | 15.0 | 5.0 | Ni | 0.50 | 5 | 600 | 5 |
| Example 21 | 1.00 | 20 | 0.1 | Sn | 15.0 | 0.5 | Ni | 0.05 | 5 | 300 | 60 |
| Example 22 | 0.50 | 20 | 2.0 | Sn | 15.0 | 5.0 | Ni | 0.50 | 10 | 600 | 5 |
| Example 23 | 1.00 | 20 | 2.0 | Sn | 15.0 | 0.5 | Ni | 0.05 | 10 | 300 | 60 |
| Example 24 | 0.50 | 20 | 0.1 | Sn | 12.0 | 5.0 | Ni | 0.50 | 5 | 600 | 5 |
| Example 25 | 1.00 | 20 | 0.1 | Sn | 12.0 | 0.5 | Ni | 0.05 | 5 | 300 | 60 |
| Example 26 | 0.50 | 20 | 2.0 | Sn | 12.0 | 5.0 | Ni | 0.50 | 10 | 600 | 5 |
| Example 27 | 1.00 | 20 | 2.0 | Sn | 12.0 | 0.5 | Ni | 0.05 | 10 | 300 | 60 |
| Example 28 | 0.50 | 20 | 2.0 | Sn | 10.0 | 1.0 | Ni | 0.50 | 10 | 450 | 5 |
| Example 29 | 0.75 | 20 | 2.0 | Sn | 10.0 | 1.0 | Ni | 0.50 | 10 | 450 | 5 |
| Example 30 | 1.00 | 20 | 2.0 | Sn | 10.0 | 1.0 | Ni | 0.50 | 10 | 450 | 5 |
| Example 31 | 1.00 | 50 | 2.0 | Sn | 10.0 | 1.0 | Ni | 0.50 | 10 | 450 | 5 |
| Example 32 | 0.50 | 20 | 2.0 | Sn | 1.0 | 2.0 | Ni | 0.50 | 10 | 500 | 5 |
| Example 33 | 0.75 | 20 | 2.0 | Sn | 1.0 | 2.0 | Ni | 0.50 | 10 | 500 | 5 |
| Example 34 | 1.00 | 20 | 2.0 | Sn | 1.0 | 2.0 | Ni | 0.50 | 10 | 500 | 5 |
| Example 35 | 0.50 | 20 | 2.0 | In | 10.0 | 3.0 | Ni—P | 1.00 | 10 | 600 | 5 |
| Example 36 | 0.75 | 20 | 2.0 | In | 10.0 | 3.0 | Ni—P | 1.00 | 10 | 500 | 5 |
| Example 37 | 1.00 | 20 | 2.0 | In | 10.0 | 3.0 | Ni—P | 1.00 | 10 | 400 | 5 |
| Example 38 | 0.50 | 20 | 2.0 | Zn | 10.0 | 3.0 | Ni | 1.00 | 10 | 600 | 5 |
| Example 39 | 0.75 | 20 | 2.0 | Zn | 10.0 | 3.0 | Ni | 1.00 | 10 | 500 | 5 |
| Example 40 | 1.00 | 20 | 2.0 | Zn | 10.0 | 3.0 | Ni | 1.00 | 10 | 400 | 5 |
| Example 41 | 0.50 | 20 | 2.0 | Ni | 0.5 | 3.0 | Ni | 1.00 | 10 | 600 | 5 |
| Example 42 | 0.75 | 20 | 2.0 | Ni | 0.5 | 3.0 | Ni | 1.00 | 10 | 500 | 5 |
| Example 43 | 1.00 | 20 | 2.0 | Ni | 0.5 | 3.0 | Ni | 1.00 | 10 | 400 | 5 |
| Example 44 | 0.50 | 20 | 2.0 | Cu, Ni | 0.5 | 3.0 | Ni | 1.00 | 10 | 600 | 5 |
| Example 45 | 0.75 | 20 | 2.0 | Cu, Ni | 0.5 | 3.0 | Ni | 1.00 | 10 | 500 | 5 |
| Example 46 | 1.00 | 20 | 2.0 | Cu, Ni | 0.5 | 3.0 | Ni | 1.00 | 10 | 400 | 5 |
| Example 47 | 0.50 | 20 | 2.0 | Se | 0.5 | 3.0 | Ni | 1.00 | 10 | 600 | 5 |
| Example 48 | 0.75 | 20 | 2.0 | Se | 0.5 | 3.0 | Ni | 1.00 | 10 | 500 | 5 |
| Example 49 | 1.00 | 20 | 2.0 | Se | 0.5 | 3.0 | Ni | 1.00 | 10 | 400 | 5 |
| Example 50 | 0.50 | 20 | 2.0 | Sb | 0.5 | 3.0 | Ni | 1.00 | 10 | 600 | 5 |
| Example 51 | 0.75 | 20 | 2.0 | Sb | 0.5 | 3.0 | Ni | 1.00 | 10 | 500 | 5 |
| Example 52 | 1.00 | 20 | 2.0 | Sb | 0.5 | 3.0 | Ni | 1.00 | 10 | 400 | 5 |
| Example 53 | 0.50 | 20 | 2.0 | Co | 0.5 | 3.0 | Ni | 1.00 | 10 | 600 | 5 |
| Example 54 | 0.75 | 20 | 2.0 | Co | 0.5 | 3.0 | Ni | 1.00 | 10 | 500 | 5 |

TABLE 1-continued

| | Average GOS value (°) | Proportion of KAM value (%) | Average crystal grain size (μm) | Second element | Total concen-tration of second element (at %) | Average thickness of silver-containing layer (μm) | Intermediate layer | Average thickness of intermediate layer (μm) | Processing rate of rolling (%) | Thermal treatment temperature (° C.) | Thermal treatment time (s) |
|---|---|---|---|---|---|---|---|---|---|---|---|
| Example 55 | 1.00 | 20 | 2.0 | Co | 0.5 | 3.0 | Ni | 1.00 | 10 | 400 | 5 |
| Comparative Example 1 | 3.00 | 20 | 2.0 | — | — | 3.0 | Ni | 0.50 | 5 | 100 | 3 |
| Comparative Example 2 | 3.00 | 20 | 2.0 | — | — | 3.0 | Ni | 0.50 | 15 | 200 | 3 |
| Comparative Example 3 | 0.18 | 15 | 0.1 | — | — | 3.0 | Ni | 0.50 | — | 700 | 3 |
| Comparative Example 4 | 3.00 | 20 | 2.0 | Sn | 20.0 | 3.0 | Ni | 0.50 | 5 | 700 | 3 |
| Comparative Example 5 | 2.00 | 20 | 2.0 | Sn | 20.0 | 3.0 | Ni | 0.50 | 15 | 650 | 3 |
| Comparative Example 6 | 3.00 | 20 | 2.0 | Sn | 10.0 | 0.1 | Ni | 0.50 | 5 | 200 | 3 |
| Comparative Example 7 | 2.00 | 20 | 2.0 | Sn | 10.0 | 0.1 | Ni | 0.50 | 15 | 100 | 3 |
| Comparative Example 8 | 3.00 | 20 | 2.0 | Sn | 10.0 | 3.0 | | | 5 | 700 | 3 |
| Comparative Example 9 | 2.00 | 20 | 2.0 | Sn | 10.0 | 3.0 | Ni | 5.00 | 15 | 650 | 3 |

TABLE 2

| | Coefficient of dynamic friction | Wear resistance | Contact resistance value | Heat resistance | Bending work-ability |
|---|---|---|---|---|---|
| Example 1 | ○ | ○ | ◎ | ○ | ○ |
| Example 2 | ◎ | ◎ | ◎ | ○ | ○ |
| Example 3 | ○ | ◎ | ◎ | ○ | ○ |
| Fxample 4 | ◎ | ◎ | ◎ | ○ | ○ |
| Example 5 | ◎ | ◎ | ◎ | ○ | ○ |
| Example 6 | ○ | ◎ | ◎ | ○ | ○ |
| Example 7 | ◎ | ◎ | ◎ | ○ | ○ |
| Example 8 | ○ | ◎ | ◎ | ○ | ○ |
| Example 9 | ◎ | ◎ | ◎ | ○ | ○ |
| Example 10 | ○ | ◎ | ◎ | ○ | ○ |
| Example 11 | ◎ | ◎ | ◎ | ○ | ○ |
| Example 12 | ○ | ◎ | ◎ | ○ | ○ |
| Example 13 | ◎ | ◎ | ◎ | ○ | ○ |
| Example 14 | ◎ | ◎ | ◎ | ○ | ○ |
| Example 15 | ○ | ○ | ◎ | ○ | ○ |
| Example 16 | ◎ | ○ | ◎ | ○ | ○ |
| Example 17 | ○ | ◎ | ◎ | ○ | ○ |
| Example 18 | ◎ | ◎ | ◎ | ○ | ○ |
| Example 19 | ◎ | ◎ | ◎ | ○ | ○ |
| Example 20 | ○ | ◎ | ◎ | ○ | ○ |
| Example 21 | ◎ | ◎ | ◎ | ○ | ○ |
| Example 22 | ○ | ◎ | ◎ | ○ | ○ |
| Example 23 | ◎ | ◎ | ◎ | ○ | ○ |
| Example 24 | ○ | ◎ | ◎ | ○ | ○ |
| Example 25 | ◎ | ◎ | ◎ | ○ | ○ |
| Example 26 | ○ | ◎ | ◎ | ○ | ○ |
| Example 27 | ◎ | ◎ | ◎ | ○ | ○ |
| Example 28 | ◎ | ◎ | ◎ | ○ | ○ |
| Example 29 | ◎ | ◎ | ◎ | ○ | ○ |
| Example 30 | ◎ | ◎ | ◎ | ○ | ○ |
| Example 31 | ◎ | ◎ | ◎ | ○ | ○ |
| Example 32 | ◎ | ◎ | ◎ | ○ | ○ |
| Example 33 | ◎ | ◎ | ◎ | ○ | ○ |
| Example 34 | ◎ | ◎ | ◎ | ○ | ○ |
| Example 35 | ○ | ○ | ◎ | ○ | ○ |
| Example 36 | ○ | ○ | ◎ | ○ | ○ |
| Example 37 | ○ | ○ | ◎ | ○ | ○ |
| Example 38 | ○ | ○ | ○ | ○ | ○ |
| Example 39 | ○ | ○ | ○ | ○ | ○ |
| Example 40 | ○ | ○ | ○ | ○ | ○ |
| Example 41 | ◎ | ◎ | ○ | ◎ | ○ |
| Example 42 | ◎ | ◎ | ○ | ◎ | ○ |
| Example 43 | ◎ | ◎ | ○ | ◎ | ○ |
| Example 44 | ◎ | ◎ | ○ | ○ | ○ |

TABLE 2-continued

| | Coefficient of dynamic friction | Wear resistance | Contact resistance value | Heat resistance | Bending work-ability |
|---|---|---|---|---|---|
| Example 45 | ◎ | ◎ | ○ | ○ | ○ |
| Example 46 | ◎ | ◎ | ○ | ○ | ○ |
| Example 47 | ◎ | ◎ | ○ | ○ | ○ |
| Example 48 | ◎ | ◎ | ○ | ○ | ○ |
| Example 49 | ◎ | ◎ | ○ | ○ | ○ |
| Example 50 | ◎ | ◎ | ○ | ○ | ○ |
| Example 51 | ◎ | ◎ | ○ | ○ | ○ |
| Example 52 | ◎ | ◎ | ○ | ○ | ○ |
| Example 53 | ◎ | ◎ | ○ | ○ | ○ |
| Example 54 | ◎ | ◎ | ○ | ○ | ○ |
| Example 55 | ◎ | ◎ | ○ | ○ | ○ |
| Comparative Example 1 | X | X | ○ | ○ | ○ |
| Comparative Example 2 | ○ | X | ○ | ○ | X |
| Comparative Example 3 | X | X | ○ | ○ | ○ |
| Comparative Example 4 | X | X | X | ○ | ○ |
| Comparative Example 5 | ○ | X | X | ○ | X |
| Comparative Example 6 | X | X | X | X | ○ |
| Comparative Example 7 | ○ | X | X | X | X |
| Comparative Example 8 | X | X | ○ | X | ○ |
| Comparative Example 9 | ○ | X | ○ | ○ | X |

As shown in Tables 1 and 2, in Examples 1 to 55, since the average GOS value is 1.00° or less and the proportion of KAM value of 1.00° or more is 20% or more in the silver-containing layer, the wear resistance of the electrical contact material was favorable without being influenced by the properties of the electroconductive substrate. On the other hand, in Comparative Examples 1 to 9, since the silver-containing layer was outside the ranges of the average GOS value being 1.00° or less and the proportion of KAM value of 1.00° or more being 20% or more, the wear resistance of the electrical contact material was inferior.

EXPLANATION OF REFERENCE NUMERALS

1, 2 electrical contact material
10 electroconductive substrate
20 silver-containing layer
30 intermediate layer

The invention claimed is:

1. An electrical contact material comprising:

an electroconductive substrate; and a silver-containing layer including silver provided to at least part of a surface of the electroconductive substrate, wherein an average GOS value of the silver-containing layer is 1.00° or less and a proportion of KAM value of 1.00° or more in the silver-containing layer is 20% or more in a cross section of the electrical contact material.

2. The electrical contact material according to claim 1, wherein an average crystal grain size in the silver-containing layer is 0.2 μm or more and 2.0 μm or less.

3. The electrical contact material according to claim 1, wherein the silver-containing layer is a pure silver layer.

4. The electrical contact material according to claim 1, wherein an average thickness of the silver-containing layer is 0.5 μm or more and 5.0 μm or less.

5. The electrical contact material according to claim 1, further comprising an intermediate layer consisting of nickel or nickel alloy between the electroconductive substrate and the silver-containing layer.

6. The electrical contact material according to claim 5, wherein an average thickness of the intermediate layer is 0.01 μm or more and 3.00 μm or less.

7. A contact including the electrical contact material according to claim 1.

8. A terminal including the electrical contact material according to claim 1.

9. A connector including the electrical contact material according to claim 1.

10. The electrical contact material according to claim 2, wherein the silver-containing layer is a pure silver layer.

11. The electrical contact material according to claim 2, wherein an average thickness of the silver-containing layer is 0.5 μm or more and 5.0 μm or less.

12. The electrical contact material according to claim 2, further comprising an intermediate layer consisting of nickel or nickel alloy between the electroconductive substrate and the silver-containing layer.

13. A contact including the electrical contact material according to claim 2.

14. A terminal including the electrical contact material according to claim 2.

15. A connector including the electrical contact material according to claim 2.

16. The electrical contact material according to claim 3, wherein an average thickness of the silver-containing layer is 0.5 μm or more and 5.0 μm or less.

17. The electrical contact material according to claim 3, further comprising an intermediate layer consisting of nickel or nickel alloy between the electroconductive substrate and the silver-containing layer.

18. A contact including the electrical contact material according to claim 3.

19. A terminal including the electrical contact material according to claim 3.

20. A connector including the electrical contact material according to claim 3.

* * * * *